United States Patent
Wintermantel

(10) Patent No.: US 12,009,584 B2
(45) Date of Patent: Jun. 11, 2024

(54) RADAR SYSTEM HAVING A PLASTIC ANTENNA WITH REDUCED SENSITIVITY TO INTERFERENCE WAVES ON THE ANTENNA AND TO REFLECTIONS FROM A SENSOR COVER

(71) Applicant: Conti Temic microelectronic GmbH, Nuremberg (DE)

(72) Inventor: Markus Wintermantel, Lindau (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 468 days.

(21) Appl. No.: 17/249,716

(22) Filed: Mar. 10, 2021

(65) Prior Publication Data

US 2021/0194115 A1  Jun. 24, 2021

Related U.S. Application Data

(63) Continuation of application No. PCT/DE2019/200098, filed on Aug. 15, 2019.

(30) Foreign Application Priority Data

Sep. 11, 2018 (DE) ...................... 10 2018 215 393.0

(51) Int. Cl.
*H01Q 1/38* (2006.01)
*H01Q 1/32* (2006.01)

(52) U.S. Cl.
CPC ............. *H01Q 1/3283* (2013.01); *H01Q 1/32* (2013.01); *H01Q 1/3233* (2013.01); *H01Q 1/38* (2013.01)

(58) Field of Classification Search
CPC ...... H01Q 1/3283; H01Q 1/3233; H01Q 1/38; H01Q 1/32
(Continued)

(56) References Cited

U.S. PATENT DOCUMENTS 6,064,350 A * 5/2000 Uchimura ............ H01Q 21/064
343/742
11,749,900 B2 * 9/2023 Ghosh ...................... H01Q 1/38
342/4
(Continued)

FOREIGN PATENT DOCUMENTS

| CN | 1677749 A | 10/2005 |
|----|-----------|---------|
| CN | 101019274 A | 8/2007 |

(Continued)

OTHER PUBLICATIONS

Office Action dated Mar. 24, 2023, for the counterpart Chinese Patent Application No. 201880062010.4 and DeepL Translation.
(Continued)

*Primary Examiner* — Hai V Tran

(57) ABSTRACT

A radar system for detecting the surroundings of a motor vehicle, the radar system includes a plastic-based antenna having a front side facing a cover. The plastic-based antenna has a plurality of individual antennas for transmitting and/or receiving radar signals to detect objects and/or determining angles thereof. The front side between the individual antennas is configured to be at least partially not reflective on a surface thereof such that interference waves on the surface of the plastic-based antenna and/or reflections between the plastic-based antenna and the cover are suppressed or the negative effects thereof on the determination of angles are at least reduced.

5 Claims, 6 Drawing Sheets

(58) Field of Classification Search
USPC .......................................................... 343/702
See application file for complete search history.

(56) References Cited

U.S. PATENT DOCUMENTS

| | | | |
|---|---|---|---|
| 2002/0163478 A1* | 11/2002 | Pleva | H01Q 21/0043 343/700 MS |
| 2003/0011519 A1 | 1/2003 | Breglia et al. | |
| 2004/0257292 A1 | 12/2004 | Wang | |
| 2005/0069277 A1* | 3/2005 | Nakazawa | G01S 7/032 385/147 |
| 2007/0002305 A1* | 1/2007 | Lehre | H01Q 25/00 359/566 |
| 2007/0279303 A1 | 12/2007 | Schoebel | |
| 2012/0001791 A1 | 1/2012 | Wintermantel | |
| 2015/0042502 A1* | 2/2015 | Gorriti | H01Q 17/002 427/9 |
| 2015/0097730 A1 | 4/2015 | Pontes | |
| 2015/0109162 A1* | 4/2015 | Binzer | H01Q 1/3233 427/402 |
| 2015/0214627 A1 | 7/2015 | Komoriya et al. | |
| 2015/0349414 A1* | 12/2015 | Tagi | H01Q 1/422 343/872 |
| 2016/0268693 A1 | 9/2016 | Ding | |

FOREIGN PATENT DOCUMENTS

| | | |
|---|---|---|
| CN | 102110884 A | 6/2011 |
| CN | 102356332 A | 2/2012 |
| CN | 104515976 A | 4/2015 |
| EP | 1662609 A1 | 5/2006 |
| JP | 2008258772 A | 10/2008 |
| JP | 2013190230 A | 9/2013 |
| JP | 2014190720 A | 10/2014 |
| JP | 2015181222 A | 10/2015 |
| JP | 2018007108 A | 1/2018 |
| WO | 2016144956 A1 | 9/2016 |
| WO | 2017194503 A1 | 11/2017 |
| WO | 2018001921 A1 | 1/2018 |

OTHER PUBLICATIONS

Notice of Reasons of Refusal drafted Jul. 14, 2023 for the counterpart Japanese Patent Application No. 2020-547181 and Global Dossier translation of same.
Chinese Second Office Action dated Sep. 20, 2023 for the counterpart Chinese Patent Application No. 201980029342.7 and translation of same.
Examination Report dated Dec. 6, 2023, from corresponding European patent application No. 19759289.2.
Doojin Lee et al. "Investigation of skull defect using resistive dipole antenna on cranial surgery phantom model", Proceedings of 2017 IEEE CAMA, 2017, IEEE, Tsukuba, Japan.
Office Action dated Dec. 5, 2023 from corresponding Chinese patent application No. 20190029342.7.
Notice of Allowance dated Dec. 5, 2023 from corresponding Chinese patent application No. 20190029342.7.
Office Action dated Dec. 5, 2023 from corresponding Japanese patent application No. 2020-547181.

* cited by examiner

RADAR SYSTEM HAVING A PLASTIC ANTENNA WITH REDUCED SENSITIVITY TO INTERFERENCE WAVES ON THE ANTENNA AND TO REFLECTIONS FROM A SENSOR COVER

CROSS REFERENCE TO RELATED APPLICATIONS

This application is a continuation of International application No. PCT/DE2019/200098, filed Aug. 15, 2019, which claims priority to German patent application No. 10 2018 215 393.0, filed on Sep. 11, 2018, each of which is hereby incorporated by reference.

TECHNICAL FIELD

The technical field relates generally to a radar system for deployment for driver assistance systems in motor vehicles and more particularly to a radar system with a plastic-based waveguide antenna.

BACKGROUND

Motor vehicles are increasingly equipped with driver assistance systems which detect the surroundings with the aid of sensor systems and deduce automatic reactions of the vehicle and/or instruct, in particular warn, the driver, as a result of the traffic situation thus recognized. A distinction is made between comfort and safety functions.

FSRA (Full Speed Range Adaptive Cruise Control) plays the most important role in current development, as a comfort function. The vehicle regulates the ego-speed to the desired speed predefined by the driver if the traffic situation permits this; otherwise, the ego-speed is automatically adapted to the traffic situation.

Safety functions now exist in many and diverse forms. One group is made up of functions for reducing the braking or stopping distance in emergency situations right up to autonomous emergency braking. A further group includes lane change functions: they warn the driver or intervene in the steering if the driver would like to perform a dangerous lane change, that is to say if a vehicle is located on the adjacent lane either in the blind spot (referred to as BSD—"Blind Spot Detection") or is approaching quickly from behind (LCA—"Lane Change Assist").

However, in the foreseeable future, the driver will no longer only be assisted, but rather the job of the driver will increasingly be performed autonomously by the vehicle itself, i.e., the driver will be increasingly replaced; this phenomenon is known as autonomous driving.

Radar sensors are deployed, including frequently in fusion with other technology's sensors such as e.g. camera sensors, for systems of the type described above. The advantage of radar sensors is that they work reliably, even in poor weather conditions, and, in addition to the distance of objects, they can also directly measure the radial relative speed thereof by means of the Doppler effect. 24 GHz, 77 GHz and 79 GHz are utilized as transmitting frequencies.

Due to the increasing functional scope of such systems, the requirements, e.g., in terms of the maximum detection range, are constantly increasing. Even so, a considerable fall in price is taking place at the same time.

The central element of each radar sensor is the antenna; it is key in defining the performance and price of the sensor. Currently, the antennas are mostly realized in planar technology on a high-frequency circuit board, e.g., as patch antennas. The disadvantages of such an antenna realization are, on the one hand, the losses in the supply cables and antennas themselves (which limits the range) and, on the other hand, the high costs of such a circuit board (in particular because special high frequency-capable substrates are required, which are expensive and require elaborate processing). In addition, such planar antennas are vulnerable or respectively sensitive to multiple reflections between the antenna and the sensor- and/or vehicle-side cover, that is to say the so-called radomes. Such multiple reflections lead in particular to a deterioration in the quality of the angulation, which can for example lead to an incorrect lane allocation of vehicles and, thus, to an incorrect system reaction. Similar effects are also produced by interference waves, in particular surface waves on the antenna, which lead to couplings and changes in the beam characteristics. A currently used approach to reducing such effects is the use of absorbent material outside of the beam region of the actual antennas, but this is associated with additional costs.

In the meantime, alternative approaches to realizing the antenna are now being investigated; plastic-based waveguide antennas stand out as a promising approach since, on the one hand, they have very low losses and, on the other, comparatively low material costs, and methods for producing them which are also suitable for large series now exist.

As such, it is desirable to present configurations of plastic antennas which have reduced sensitivity to interference waves on the surface of the antenna and to reflections from a sensor cover, in order in particular to realize a more robust angulation. In addition, other desirable features and characteristics will become apparent from the subsequent summary and detailed description, and the appended claims, taken in conjunction with the accompanying drawings and this background.

SUMMARY

According to one embodiment, a radar system for detecting the surroundings of a motor vehicle includes a plastic-based antenna, wherein the plastic antenna, on a front side facing a sensor- and/or vehicle-side cover, has a plurality of individual antennas for transmitting and/or receiving radar signals and the plurality of individual antennas are utilized for detecting objects and/or determining angles thereof. The front side of the plastic antenna between the individual antennas is configured to be at least partially not reflective, that is to say in particular not metallized, on the surface thereof and is configured at least partially from plastic material which partially or wholly absorbs radar waves, and/or the front side of the plastic antenna has passive antennas, so-called blind antennas, between the individual antennas, which do not reflect back at least a part of the power received by them again, but rather absorb it into the plastic material, and/or the front side of the plastic antenna between the individual antennas is configured to be at least partially not reflective, that is to say in particular not metallized, on the surface thereof, wherein in particular the structures and/or metallizations inside the antenna are not universally homogeneous, and/or the front side of the plastic antenna has at least in part a non-planar, reflective surface, that is to say in particular a non-planar, metallized surface, and/or the edges of the front side of the plastic antennas do not lie parallel, in particular they lie obliquely, to the individual antennas.

Thanks to such a configuration, interference waves on the surface of the antenna and/or reflections between the antenna and the sensor-side and/or vehicle-side cover are suppressed or respectively the negative effects thereof in particular on the determination of angles are prevented or reduced.

In one embodiment, the front side of the plastic antenna has a non-planar reflective surface, the individual antennas have a concentration in the vertical dimension, i.e., in the elevation, having a main beam direction approximately at elevation 0°, and the surface does not run linearly with respect to vertical sections. In one configuration, the surface runs with a stepped or sawtooth-shaped course or combinations thereof with respect to the vertical sections.

In one embodiment, the surface is only wholly or partially non-planar outside of the individual antennas. It is, however, also possible that the individual antennas wholly or partially have a non-planar surface as well.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 1:
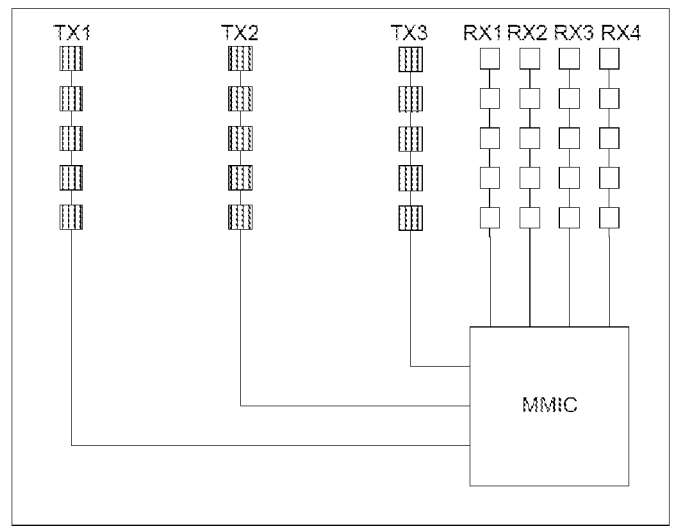
FIG. 1 shows transmitting and receiving antennas as planar patch antennas according to one exemplary embodiment.

Antennas for radar systems for detecting the surroundings are often realized as planar antennas on a high-frequency circuit board. FIG. 1 shows a high-frequency circuit board having a high-frequency component, a so-called MMIC (Monolithic Microwave Integrated Circuit) and having three transmitting antennas (TX1, TX2, TX3) and four receiving antennas (RX1, RX2, RX3, RX4), wherein the antennas are each composed of a plurality of antenna elements (so-called patches). The patches of the transmitting antennas are only depicted hatched in FIG. 1 in order to distinguish them—they have the same structure, physically, as the patches of the receiving antennas. Transmitting antennas and their feeds are also depicted hatched in some further images, wherein their physical structures are always the same as in the case of the receiving antennas.

The antennas and their supply cables from the high-frequency chip require, on the upper layer of the high-frequency circuit board, a special substrate with material data suitable for high frequency such as, for example, defined thickness, defined dielectric constant, and/or very low loss angle. In particular, the material costs of the special substrate and its processing (including due to the necessary high structural accuracies) lead to costs increased by factors, compared to a pure low-frequency circuit board of a similar size and a similar number of layers. In addition to the costs, the signal losses in the antennas and their supply cables are also disadvantageous. For a transmitting and a receiving antenna incl. supply cables, power losses of approx. 6 dB are typical—a sensor sensitivity thus reduced by 6 dB results in a maximum sensor range which is reduced by 30%.

Figure 2:
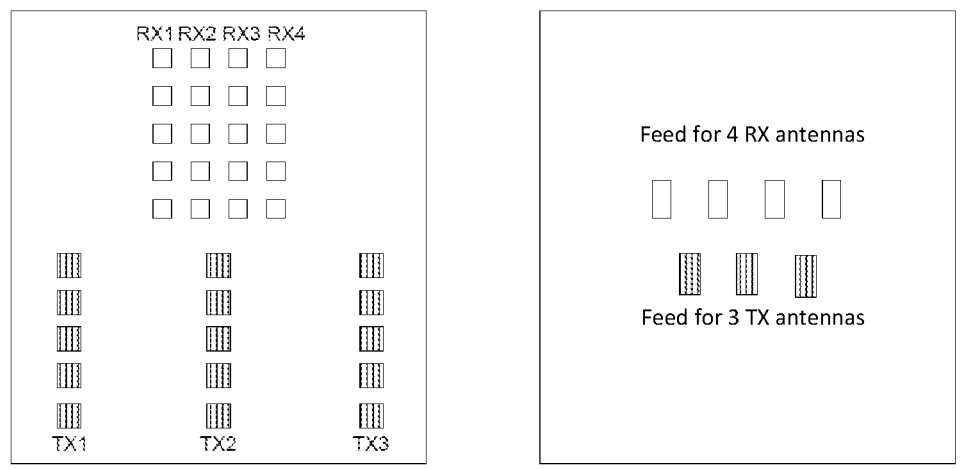
FIG. 2 shows a front side (on the left) and a back side (on the right) of a cuboid plastic-based waveguide antenna according to one exemplary embodiment.

Due to said disadvantages of circuit board-based antennas, so-called waveguide antennas are increasingly being considered; antennas and their supply cables are realized with the aid of waveguides which, in the simplest case, constitute rectangular hollow spaces having metal or metallized walls. Such an antenna can be executed as a cuboid plastic part (see FIG. 2), wherein there are openings for emission on the front side depicted in the left image, openings for feeding on the back side depicted in the right image and within hollow space structures, wherein all of the surfaces (externally and internally) are metallized. Such an antenna is typically composed of multiple layers, which, for example, also permits a crossing of high-frequency connections. Since the arrangement of the individual antennas is now independent of the chip, the three transmitting antennas can be arranged—as depicted in FIG. 2—e.g., beneath the four receiving antennas (in the case of the circuit board-based antenna according to FIG. 1, they are arranged next to one another). In particular, because the chip now no longer lies on the antenna plane, smaller sensors can also be realized.

In addition to injection molding, 3D printing is now also considered as a production method for such a plastic antenna. Waveguide antennas produced from metallized plastic have considerable cost advantages compared with a solid metal realization.

Figure 3:
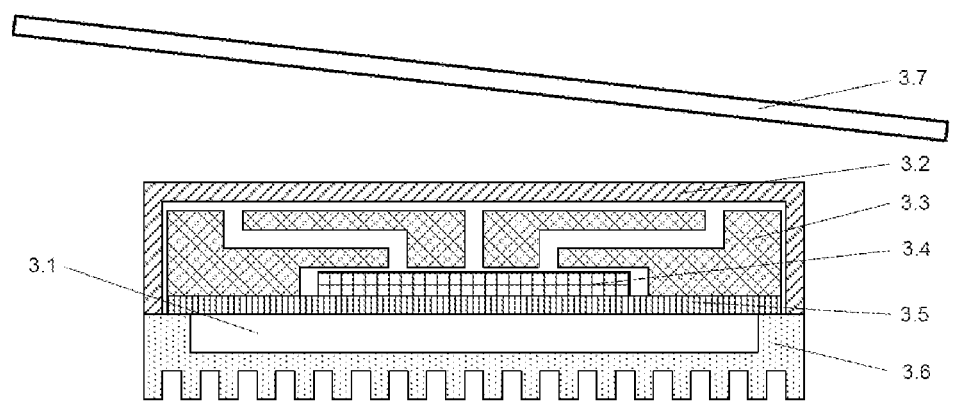
FIG. 3 shows a cross-sectional view of a radar sensor having a plastic-based waveguide antenna with the radar sensor located behind a vehicle-side cover according to one exemplary embodiment.

A section through the radar sensor 3.1 having a plastic antenna 3.3 is depicted in FIG. 3. Beneath the antenna 3.3 there is located the circuit board 3.5 having the high-frequency component 3.4, which is directly coupled to the antenna 3.3 by structures emitting or respectively receiving high-frequency signals, that is to say without passing via the circuit board 3.5. The sensor 3.1 is enclosed by an aluminum housing part 3.6 on the back side and a plastic cover 3.2 on the front side, which is also designated a sensor radome. The entire sensor 3.1 is installed behind a vehicle-side cover 3.7 (e.g., a painted bumper).

Figure 4:
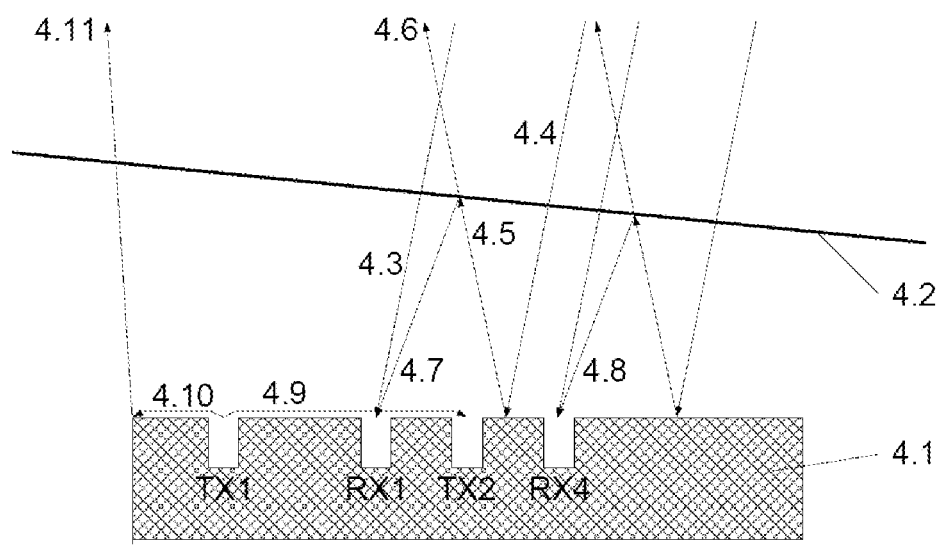
FIG. 4 shows reflections between the antenna and the vehicle-side cover and surface waves on the antenna according to one exemplary embodiment.

The vehicle-side cover 3.7 is, for the most part, not optimized in terms of its properties for penetration by radar waves. In addition to attenuation, this results in partial reflection of the radar waves. This is illustrated in FIG. 4. To simplify matters, the entire sensor is not shown in the horizontal sectional drawing therein, but rather only the plastic antenna 4.1 with a part of the antennas and a cover 4.2 located obliquely thereto. The incident wave beam 4.3 directly strikes the receiving antenna RX1. The incident wave beam 4.4 strikes the metallized surface of the antenna and is reflected from there as a wave beam 4.5—admittedly, only a part 4.6 of said reflected beam 4.5 passes through the cover, the other part 4.7 is reflected back by the cover and also strikes the receiving antenna RX1. Thus, two beams which, in general, have a different phase—even if the doubly reflected beam 4.7 has a smaller amplitude than the direct beam 4.3, it distorts the phasing and the amplitude of the receiving signal of the receiving antenna RX1—are superimposed on the receiving antenna RX1. In addition to beam 4.7, there are of course also further doubly reflected beams which strike the receiving antenna RX1. For the other receiving antennas, there is of course also the superimposition of direct and doubly reflected beams; since the cover 4.2 is located obliquely to the antenna 4.1, the relative phasing of the doubly reflected beams from antenna to antenna is, however, different, as can be easily discerned from the image for RX4 due to the different path length circumstances of the doubly reflected beam 4.8, compared with the doubly reflected beam 4.7. The receiving signals from all the combinations of transmitting and receiving antennas are utilized for the angulation; to this end, a digital beamforming is performed. If such multiple reflections result in a different influencing of the signals in terms of their amplitude and phase, the angulation is distorted, which leads to an incorrect positioning of objects, that is to say for example to an incorrect lane allocation and, thus, an incorrect system reaction. In addition, the radar reflectivity, that is to say the so-called RCS of the objects, is also incorrectly estimated via the amplitude error, which can lead to an incorrect classification.

In addition to these multiple reflections, interference waves which are propagated on the surface of the antenna also result in amplitude and phase errors of the signals. These so-called surface waves lead, on the one hand, to coupling of antennas—in FIG. 4, the transmitting antenna TX1 couples via the surface wave 4.9 into the transmitting antenna TX2; on the other hand, this results in additional emission at the edges of the antenna—in FIG. 4 this results via surface wave 4.10 of transmitting antenna TX1 in emission 4.11 at the left edge.

Various measures will now be explained below, in order to avoid or at least reduce such effects with a plastic antenna.

A first approach consists of producing at least the upper layer of the plastic antenna from radar-absorbing plastic material and not metallizing the front side of the antenna. Thus, both multiple reflections between the antenna and the sensor- or respectively vehicle-side cover and surface waves on the antenna are suppressed or at least reduced. Some absorbing materials require a conducting stratum on the back side thereof: the latter is achieved in that the back side of the one or more absorbent plastic layers are metallized. In order to realize such an absorber-based suppression of multiple reflections between the antenna and the sensor- or respectively vehicle-side cover and surface waves on the antenna with the planar antennas which are deployed nowadays, one or more additional absorbing elements are deployed, which leads to additional costs which can be prevented at least to the greatest possible extent by the above approach.

Figure 5:
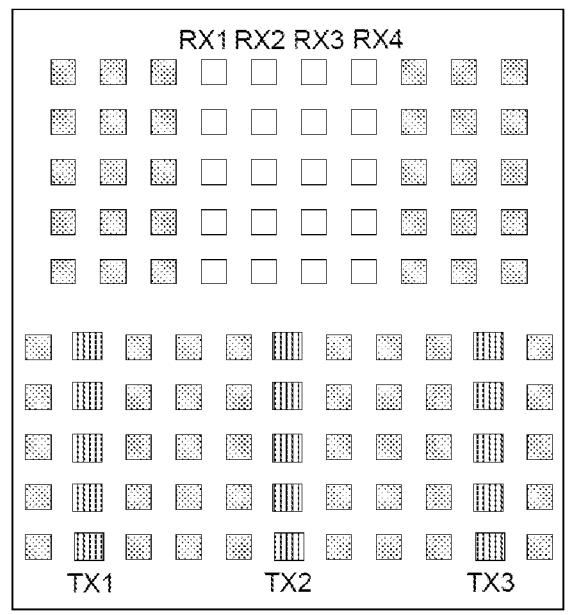
FIG. 5 shows a front side of the plastic antenna having additional blind antennas.

In a second embodiment (see FIG. 5), so-called blind antennas are inserted between the actual antennas; these are depicted dotted in FIG. 5, wherein each column constitutes an individual antenna. The power received by these blind antennas is at least partially absorbed in its discharge cables which are realized in the interior of the antenna in that absorbent plastic is utilized there and the walls of the discharge cables are at least partially not metallized. As a result, both multiple reflections between the antenna and the sensor- or respectively vehicle-side cover and surface waves on the antenna are suppressed or at least reduced.

Figure 6:
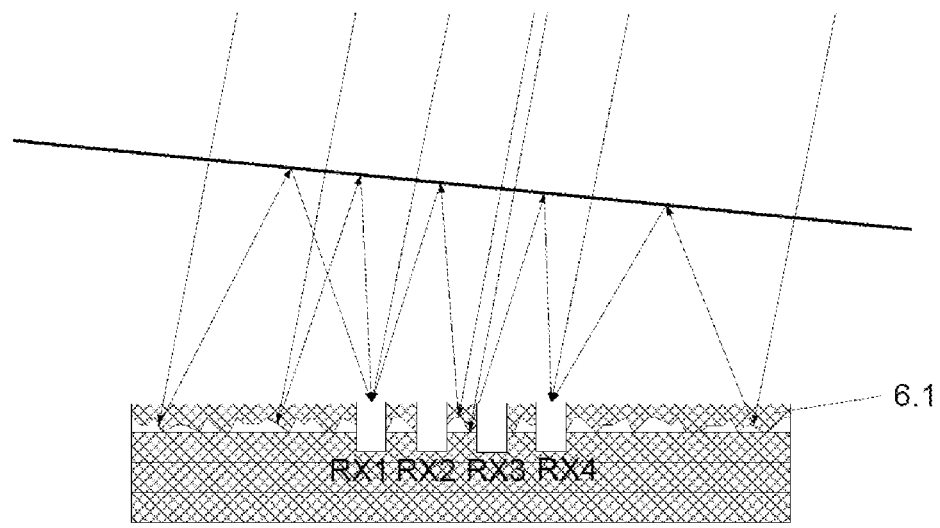
FIG. 6 shows reflections between the antenna and the vehicle-side cover in the event that the front side of the plastic antenna is not metallized and the upper layer of the antenna is structured and metallized on the back side thereof in the regions between the individual antennas.

A third embodiment is depicted in FIG. 6. The planar front side of the plastic antenna is not metallized there. The upper layer 6.1 of the antenna is structured and metallized on the back side thereof in the regions between the individual antennas, wherein the form of the structuring varies. As a result, the beams incident between the individual antennas are first reflected by the back side of the upper layer and, due to the different thickness of the upper layer due to the structuring, the reflected beams experience different phasing, i.e., they are scattered in different directions. These beams which are backscattered by the plastic antenna are partially reflected by the vehicle-side cover and, consequently, thrown back onto the antenna. Only the beams which are reflected back are depicted in FIG. 6; the portion which does not penetrate the cover is not depicted since it is not relevant for further consideration. There, the beams are incident on the respectively five receiving elements of the receiving antenna with different phasings. Consequently, they are not, in general, coherently superimposed in each of the receiving antennas, but rather are partially extinguished, so that these doubly reflected interference components are reduced in their amplitude and, thus, in their effect. However, due to the irregular structuring, these interference components also vary across the individual antennas in amplitude and phase; even if these interference components are reduced, they lead to errors in the angulation (which is realized by digital beamforming). Periodic errors which repeat periodically across the individual antennas, which can lead to side lobes in the digital beamforming and, thus, to ghost targets are in particular critical; in addition to the real object, a further non-existent object is created at another angle in the angulation. Therefore, the varying structuring is to be designed such that it does not have a regular pattern, but rather has a virtually random nature. To date, the structured back side of the upper layer of the plastic antenna has been metallized; however, this metallization could also be omitted. Since the air gap to the next layer is of differing thickness and the wavelengths are different in plastic and air, this also produces a scattering of the beams. This approach could also be achieved across a plurality of layers. A disadvantage of this fourth embodiment is that the part of the surface waves on the antenna, which does not penetrate the plastic, is not influenced and is therefore not reduced in its interference effect.

Figure 7:
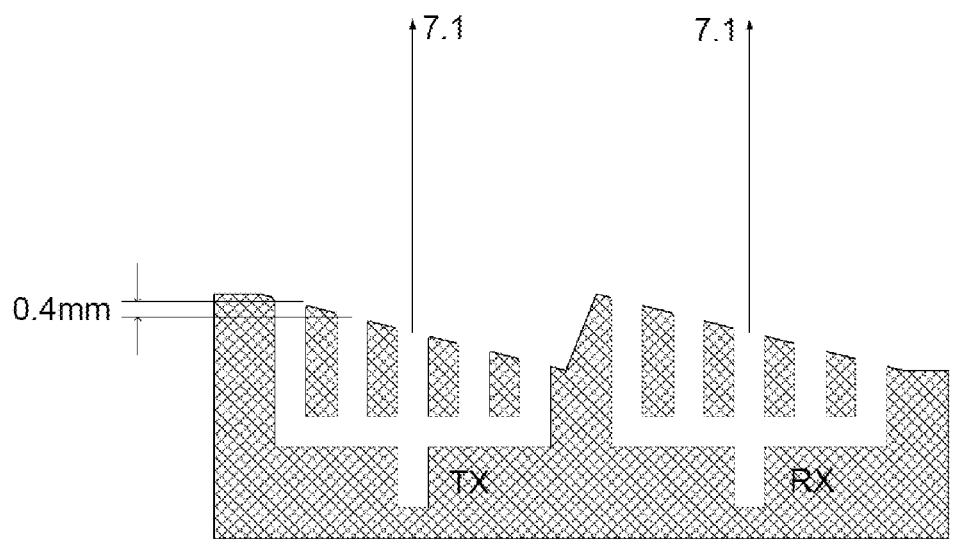
FIG. 7 shows a plastic antenna which has a sawtooth-shaped surface structuring in the vertical direction according to an exemplary embodiment.

The structuring of the then metallized front side of the plastic antenna is therefore proposed in a fourth embodiment. A first approach is—as in the third embodiment—to use a virtually random structuring. A second approach is depicted in FIG. 7; wherein FIG. 7 shows the plastic antenna in a vertical section, which thus has a sawtooth-shaped surface structuring in a vertical direction; in the horizontal direction, there is no structuring, i.e., at each point of the antenna, the vertical section looks like that in FIG. 7—including in the region of the individual antennas themselves. Since the antennas are, furthermore, to have their main emission (that is say, largest power density) in the elevation perpendicular to the total sensor, that is to say in direction 7.1, the five antenna elements thereof must each have different phasings which compensate for their different propagation outside of the antenna for perpendicular emission. As depicted in FIG. 7, the height difference between neighboring antenna elements is preferably 0.4 mm, that is to say 1/10 of the wavelength of approximately 4 mm in the case of the radar frequency considered here of 76 GHz, so that a path length difference of 1/10 of a wavelength is to be compensated for by a phase shift of 360°/10=36° for perpendicular emission from antenna element to antenna element. These phase shifts are realized by supply cables of different lengths to the antenna elements from their common supply point. This applies both to transmitting and receiving antennas.

If, for example, the coupling of the neighboring receiving antennas RX1 and RX2 (when these are arranged as in FIG. 2) is considered, this is dominated by coupling in each case of spaced antenna elements. A coupling is brought about in that the power received by the receiving antenna RX2 is partially reflected back by non-optimum adaptation, for example, to the common discharge point of the antenna elements and then coupled on the surface of the plastic antenna into the neighboring antenna element in each case of the receiving antenna RX1. The power reflected in the receiving antenna RX2 and arriving at the receiving antenna RX1 has a different phase across the antenna elements; the phase shifting due to the different path length to the common supply point acts doubly (in RX2 and RX1), so that a phase difference of 72° results from antenna element to antenna element of RX1. When there are five antenna elements, this leads to a complete extinction of the five coupled antenna element signals in the receiving antenna RX1.

The surface, which has a pronounced sawtooth shape in the vertical direction according to FIG. 7, acts in a similar manner for multiple reflections between the cover and the plastic antenna.

Figure 8A:
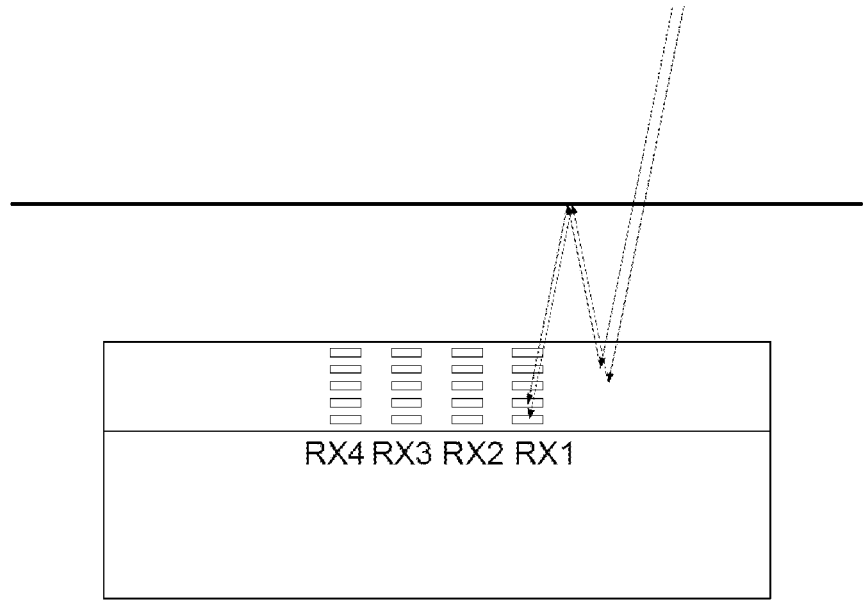
FIG. 8a is a top view showing the reflections between the antenna of FIG. 7 and the vehicle-side cover parallel to the sensor according to one exemplary embodiment.

FIG. 8a shows the antenna from above in the case of a slightly obliquely incident wave in the horizontal direction. The cover is parallel to the sensor. Due to the surface of the plastic antenna which is oblique to the cover, the doubly reflected interference beams are incident with a different phasing on the common discharge point of the five antenna elements of the receiving antenna RX4 (this applies in the same way to the other receiving antennas). Thanks to the double reflection, the path length difference of approximately 1/10 of the wavelength with respect to the two neighboring antenna elements is adopted doubly; a third path length difference is not adopted during incidence on the antenna elements, since this is compensated in the antenna by different path lengths at the common discharge point—in the same way as with the directly incident beams. Thus, the doubly reflected interference beams again result in a gradual phase offset of 72° between the five antenna elements so that they extinguish one another and, thus, can no longer disrupt the angulation. This then also makes it possible to place a lower requirement on the vehicle-side cover of the sensor, which can in particular lead to price advantages.

Figure 8B:
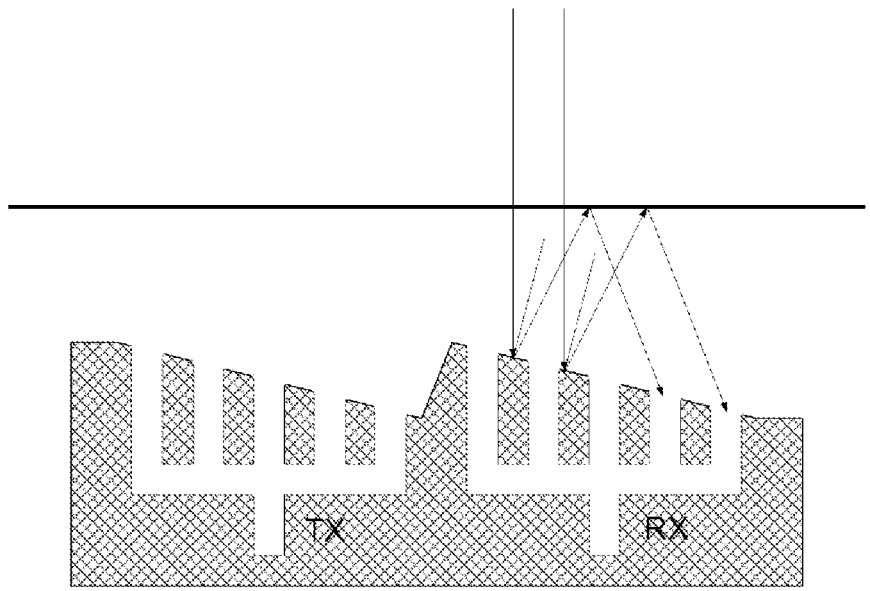
FIG. 8b is a side view showing the reflections between the antenna of FIG. 7 and the vehicle-side cover parallel to the sensor according to one exemplary embodiment.

This effect can also be alternatively explained as follows: In FIG. 8b, the antenna and these doubly reflected interference beams are depicted from the side. Thanks to the vertical tilting of the antenna surface, the interference radiation having double elevation tilting is incident on the antenna; since the antenna, due to the vertical expanse thereof, has a restricted sensitivity range around its perpendicular receiving alignment, it does not receive any power or only receives a low power of the incident waves for elevation angles deviating significantly from 0°.

The above consideration of the at least virtually complete extinction only applies to very small azimuth angles; for larger azimuth angles, the path length difference deviates from twice 1/10 of the wavelength and, thus, the phase difference of 72° considerably. Then there is only partial extinction, i.e., a part of the doubly reflected beams is still received. However, this interference component is similar across the four receiving antennas, as the structuring does not change in the horizontal direction, that is to say, in this respect, each antenna sees the same environment. However, the environment of the antennas and, thus, the interference components is not completely identical, since differences exist for example regarding the position of the edges of the plastic antenna and also of the neighboring antenna structures.

It should also be commented that the above consideration also applies similarly to the transmitting antennas; there, the doubly reflected beams distort the amplitude and phase of the output waves and, thus, equally the angulation, since this is realized across the signals from all combinations of transmitting and receiving antennas.

In the fourth embodiment having a sawtooth-shaped structuring of the surface, the antennas themselves were also realized on the structured surface, that is to say vertically tilted. Alternatively, only the regions between the antennas can be structured in a sawtooth shape, while all of the antennas themselves are realized in one plane; in addition to the antennas, there are then steps which vary across the antenna elements.

Instead of a sawtooth-shaped structuring—that is to say a continual tilting—a stepped structuring can also be used.

Figure 9:
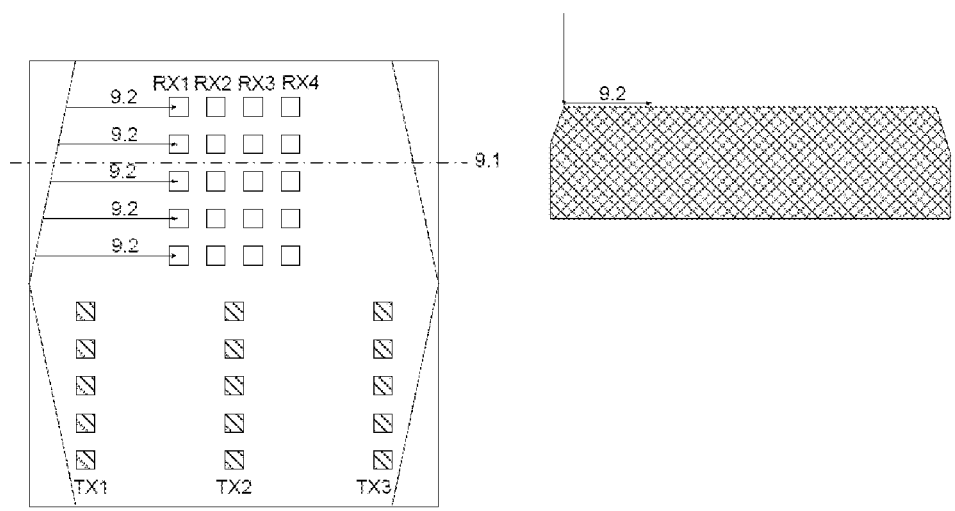
FIG. 9 shows a plastic antenna with right and left borders of a front side of lying obliquely to the individual antennas where the left image shows the antenna from the front and the right image shows a horizontal section in the identified plane.

In the fifth embodiment according to FIG. 9, the right and left borders of the front side of the plastic antenna lie, in each case, obliquely to the individual antennas; the left image shows the antenna from the front, the right shows a horizontal section in the plane 9.1. The surface waves 9.2 acting on the receiving side then arrive at the five antenna elements of the receiving antenna RX1 with different path lengths and therefore phasings, so that they are at least partially extinguished (this applies similarly to the other receiving antennas and the transmitting antennas). Instead of obliquely arranged edges, other forms, e.g., stepped and jagged courses, can of course also be deployed.

It is also noted that it is not only the vehicle-side cover of the sensor, but rather also the sensor-side cover, that is to say the front sensor housing, that results in multiple reflections with correspondingly negative effects. The measures described above apply similarly here as well, which results in improved sensor performance and/or lower requirements in terms of the sensor housing.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A radar system for detecting the surroundings of a motor vehicle, the radar system comprising:
   a plastic-based antenna having a front side facing a cover, the plastic-based antenna having plurality of individual antennas for transmitting and/or receiving radar signals to detect objects,
   wherein the front side of the plastic-based antenna is configured to be at least partially not reflective on an upper surface therof,
   wherein the front side of the plastic-based antenna has a non-planar reflective surface, individual antennas among the plurality of individual antennas have a concentration in the vertical dimension with a main beam direction approximately at elevation 0°, and the non-planar reflective surface surface does not run linearly with respect to vertical sections.

2. The radar system as set forth in claim 1, wherein the non-planar reflective surface runs with a stepped or sawtooth-shaped course or combinations thereof with respect to vertical sections.

3. The radar system as set forth in claim 1, wherein the non-planar reflective surface is at least partially non-planar outside of the individual antennas.

4. The radar system as set forth in claim 1, wherein the individual antennas at least partially have a non-planar surface.

5. A radar system for detecting the surroundings of a motor vehicle, the radar system comprising:

a plastic-based antenna having a front side facing a cover, the plastic-based antenna having a plurality of individual antennas for transmitting and/or receiving radar signals to detect objects, wherein the front side of the plastic-based antenna between individual antennas among the plurality of individual antennas are configured to be at least partially non-metallized on surfaces of the individual antennas and are configured at least partially from plastic material which partially or wholly absorbs radar waves, and/or the front side of the plastic-based antenna comprises passive antennas disposed between the individual antennas, and the passive antennas absorb at least a part of power received by them, and/or the front side of the plastic antenna between the individual antennas is configured to be at least partially not reflective, that is in particular not metallized, on the surface thereof, wherein in particular the structures and/or metallizations inside the antenna are not universally homogeneous, and/or the front side of the plastic-based antenna comprises a non-planar, reflective surface, that is in particular a non-planar metallized surface, and/or edges of the front side of the plastic-based antenna lie obliquely to the individual antennas, and wherein interference waves on the surfaces of the individual antennas and/or reflections between the individual antennas and the cover are suppressed or respectively the negative effects thereof in particular on the determination of angles are prevented or reduced.

* * * * *